Figure 1:
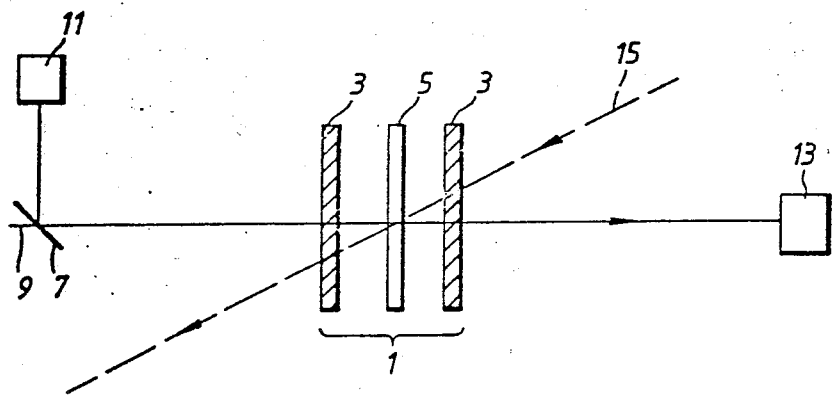

United States Patent [19]

Bennion et al.

[11] Patent Number: 4,834,511

[45] Date of Patent: May 30, 1989

[54] OPTICAL RESONANT ASSEMBLY

[75] Inventors: Ian Bennion, Ravensthorpe; Rosemary Cush, Duston; Christopher J. Groves-Kirkby, Bugbrooke, all of United Kingdom

[73] Assignee: Plessey Overseas Limited, Ilford, England

[21] Appl. No.: 893,429

[22] Filed: Aug. 5, 1986

[30] Foreign Application Priority Data

Aug. 6, 1985 [GB] United Kingdom ............... 8519711

[51] Int. Cl.⁴ .................. G02B 5/23; G02B 5/30; G02F 1/01; H01S 3/00
[52] U.S. Cl. .................................... 350/354; 350/393; 330/4.3
[58] Field of Search ................. 350/354; 77/393; 332/7.51; 330/4.3

[56] References Cited

U.S. PATENT DOCUMENTS

| | | | |
|---|---|---|---|
| 3,476,459 | 11/1969 | Reader | 350/354 |
| 4,558,923 | 12/1985 | Hoffman et al. | 350/354 |
| 4,573,767 | 3/1986 | Jewell | 350/354 |
| 4,630,898 | 12/1986 | Jewell | 350/354 |

FOREIGN PATENT DOCUMENTS

| | | |
|---|---|---|
| 3335318 | 4/1984 | Fed. Rep. of Germany . |
| 1421140 | 1/1964 | France . |
| 1592114 | 6/1970 | France . |
| 1342421 | 1/1974 | United Kingdom . |
| 2114313 | 8/1983 | United Kingdom . |

OTHER PUBLICATIONS

Keyes, "Nonlinear Absorbers of Light", IBM Journal of Research and Development, vol. 7, No. 5, Oct. 1963, pp. 334-336.
Perveyev et al., "AgCl-CuCl Photochromic Coatings", Soviet Journal of Optical Technology, Feb. 1972, pp. 117-118.
Peyghambarian et al., "Optical Nonlinearity and Bistability Due to the Biexciton Two-Photon Resonance in CuCl", Optical Bistability 2 Plenum Press, Jun. 15-17, 1983, pp. 259-266.
IEEE Journal of Quantum Electronics, vol. QE-17, No. 3, Mar. 1981, David Miller et al, "Optical Bistability in Semiconductors", pp. 312-317, chp I,IV.

Primary Examiner—Eugene R. LaRoche
Assistant Examiner—Michael B. Shingleton
Attorney, Agent, or Firm—Fleit, Jacobson, Cohn & Price

[57] ABSTRACT

An optical resonant assembly which has at least two stable light transmittance values dependent on incident light beams. The assembly consists of a pair of parallel partially transmission mirrors with a photochromic layer placed therebetween which has a refractive index dependent upon the intensity of incident light beams. The parallel mirrors constitute a Fabry-Perot type resonator. The incident light beams have the effect of "couloring" or "bleaching" the photochromatic material.

10 Claims, 2 Drawing Sheets

OPTICAL RESONANT ASSEMBLY

The present invention relates to an optical resonant assembly and more particularly to such an assembly using an organic photochromic material.

Photochromic materials have the ability to undergo reversible changes to different chemical species with characteristic optical absorption spectra under the action of light. It is known that some photochromic materials when exposed to ultra-violet or blue radiation have enhanced absorption for light in the visible spectrum. This state however rapidly decays on exposure to visible radiation to produce a "bleached" state compared to the previous coloured state.

Previously, as illustrated in U.S. Pat. No. 4,573,767 (Jewell), optical bistable assemblies may have been constructed of saturable dye absorbers where the action of the illuminating light is to displace the equilibrium of chemical species and so the properties of the absorber. However, when the illuminating light is removed the absorber rapidly returns to its normal absorbing state.

It is an objective of the present invention to provide an optical resonant assembly using a photochromic material wherein bleaching and colouring effects of light are used to provide a plurality of stable optical transmission states.

According to the present invention there is provided an optical resonant assembly comprising a resonant cavity which has a plurality of partially transmitting mirrors, a layer of photochromic material mounted between the mirrors, a first light source providing a first light beam incident upon one side of the photochromic material at a predetermined position and a second light source providing a second light beam also incident upon the photochromic material at said predetermined position, the first light beam having a wavelength which bleaches said photochromic material and the second light beam having a wavelength which colours said photochromic material, the first and second light beams having an ambient intensity state at which bleaching and colouring effects are substantially balanced and at which transmittance values may be measured and a second intensity state in which bleaching or colouring effects are enhanced to effect a change in the ambient transmittance value whereby data may be written and read to and from the photochromic material.

Preferably first detecting means is provided preceding said resonant cavity and second detecting means is provided after said resonant cavity said first detecting means receiving a proportion of either the first or the second light beam whereby a comparison between the intensity measured by said first detecting means and the intensity measured by said second detecting means may be used to determine the transmittance of said photochromic material.

The optical resonant assembly may be used as a logic gate by providing either a plurality of first light beam sources or a plurality of second light beam sources, said plurality of sources individually having insufficient intensity to effect a change in state of the photochromic material and in combination having sufficient intensity to effect such a change.

Figure 2:
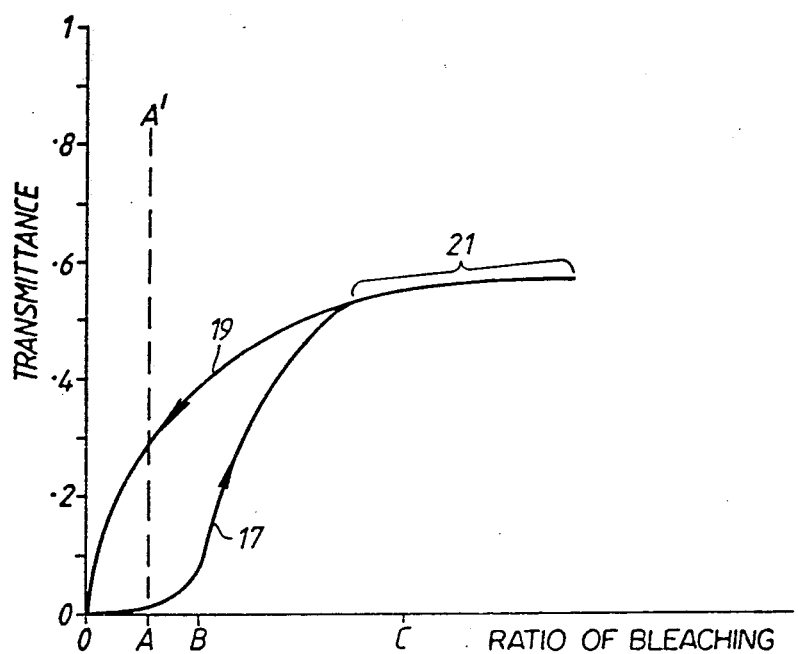
Figure 3:
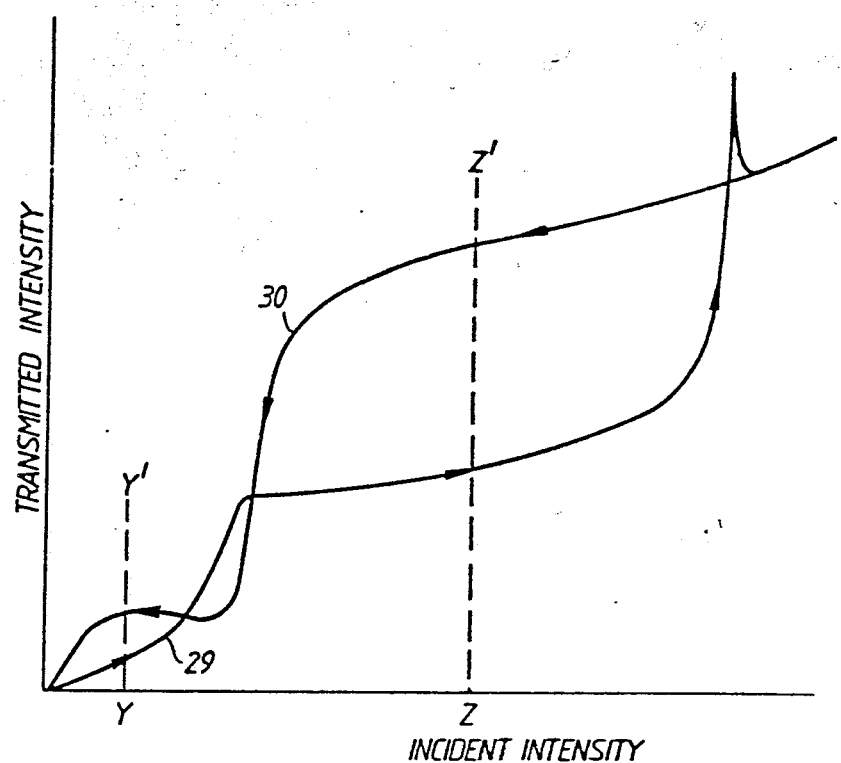

An optical resonant assembly in accordance with the invention will now be described by way of example only with reference to the accompanying drawings of which, FIG. 1 illustrates a systematic view of an optical resonant assembly according to the present invention;

FIG. 2 is a graph showing a typical relationship, between transmittance and incident light intensity for a bistable configuration of optical resonant assembly shown in FIG. 1; and FIG. 3 is a graph showing typical relation between transmitted intensity and incident intensity for a configuration of the present invention with a plurality of stable states.

Referring to FIG. 1, a Fabry-Perot resonant cavity 1 tuned to resonate at an appropiate bleaching wavelength is constructed of partially transmitting mirrors 3 and a layer of photochromic material 5 supported on an optically transmitting matrix is placed between the mirrors 3. A beamsplitter 7 is placed before the Fabry-Perot cavity 1 directing a portion of a bleaching beam 9 to an incident light intensity detector 11 and a portion of the beam 9 to the Fabry-Perot cavity 1 where it is transmitted through the cavity 1 including the photochromic layer 5 to be collected by a transmitted light intensity detector 13. A colouring beam 15 having a colouring wavelength is also incident upon the Fabry-Perot resonant cavity 1 and strikes the photochromic layer 5 simultaneously with the bleaching beam 9 at substantially the same predetermined position of location but on the opposed side of the photochromic layer 5. It will be appreciated that the cavity 1 may also resonate at the colouring wavelength provided the colouring wavelength resonance does not coincide with the bleaching wavelength resonance.

Consider also FIG. 2, as the intensity of the bleaching beam 9 relative to the colouring beam 15 i.e. the incident light intensity ratio is increased (usually either beam is kept constant and the other varied), the light transmittance value of the photochromic layer 5 to the incident intensity ratio relationship follows the curve 17. The Fabry-Perot resonant cavity 1/photochromic layer 5 is usually kept under constant ambient illumination at an incident intensity ratio A having a first ambient light transmittance value. As the incident intensity ratio A is increased past a value of B the light transmittance value rapidly increases due to the cavity 1 resonance gain overcoming the photochromic layer 5 absorption loss giving an increased resonant power of the cavity 1 at the bleaching wavelength. A bleached state 21 occurs in the photochromic layer 5 having a bleaching light transmittance value at an incident intensity C. As the incident intensity at the ratio C is light transmittance value follows the curve 19 back to the ambient incident intensity ratio A but with a second ambient light transmittance value.

The assembly therefore has two stable states, a first ambient light transmittance value on curve 17 equivalent to logic O and a second ambient light transmittance value on curve 19 equivalent to logic 1. A data storage function can therefore be achieved by purely optical means.

It will be appreciated that control of the optical resonant assembly can be provided by varying either the bleaching light beam 9 or colouring light beam 15 as the data storage function in the assembly depends on utilising the conjunctive antagonistic effects of these beams on the photochromics layer 5. Also as most photochromics have wide homogeneous absorption bands, control of the assembly could be acheived by a fixed component at one wavelength i.e. the bleaching light beam 9 and a modulating component i.e. the colouring beam 15 at another within the absorption band.

The speed of the data storage function in the optical resonant assembly depends upon the power intensity of the incident light beams i.e. bleaching light beam 9 and colouring light beam 15, and consequently for rapid data storage high powered light sources or lasers are required.

In order to read the data stored in the optical resonant assembly, light intensity values detected by incident detector 11 and transmitted detector 13 are compared at the ambient incident intensity ratio A deducing the light transmittance value ie. low transmittance value, logic 0, whilst high transmittance value, logic 1.

In the present invention it is preferable that photochromic materials with long time constants of thermal decay from a high transmittance value to low transmittance value are used. Thus, if both bleaching beam 9 and colouring beam 15 are removed simultaneously then data can be stored for long periods i.e. determined by the decay constant, of time without constant illumination.

FIG. 3 illustrates a typical transmitted intensity to incident intensity ratio for an optical resonant assembly in accordance with the present invention having more than two stable light transmittance values. A first pair of stable light transmittance values occur on the intersections of line Y—Y' with the curves 29 and 30 while a second pair of stable light transmittance values occur at the intersections of line Z—Z' with the curves 29 and 30. This bistable assembly is acheived by using a sufficiently thick or high concentration photochromic layer 5 that the change in refractive index in the photochromic layer aids tuning and de-tuning of the resonant cavity 1 giving an added optical phase change contribution. The bi-stable nature is due to an increase in the incident intensity ratio causing a change in light absorption by the photochromic layer 5 as bleaching overcomes colouring. This change in light absorption in turn alters the photochromic layer 5 refractive index which consequently changes tuning of the cavity 1.

A logic 'AND' device may be constructed by adding two light beams to give a single input bleaching beam 9. Each individual light beam of the two light beams is of insufficient intensity to cause bleaching. However, the combined intensity i.e. an AND function, of the two light beams is sufficient to give rise to bleaching and hence an increased light transmittance value.

Due to the high resolution capacity of photochromic materials large numbers of data bits can be stored at spaced positions upon the photochromic layer 5. The data bits may be addressed either by deflecting the incident beam 9 by conventional means or by moving the Fabry-Perot resonant cavity 1 and/or the photochromic layer 5 in light the beams.

Examples of photochromic materials which may be used include Ex-2,5-dimethyl-3-furyl-ethylidene(isopropylidene)succinic anhydride in toluene or Ex-2,5-dimethyl-3-furyl-ethylidene(admentylidene)succinic anhydride in toluene, however other known photochromics materials may be used.

The bleaching beam can be provided by, for example an Agron ion laser or any laser operating in the blue/green/yellow region of the electromagnetic spectrum and the colour beam may be provided by a Mercury lamp, Helium-Cadmium laser or any suitable U.V. source.

We claim:

1. An optical resonant assembly for coupling to at least one first light source and to at least one second light source, each first light source being arranged to provide a bleaching light beam, having a bleaching wavelength and each second light source being arranged to provide a colouring light beam having a colouring wavelength, the assembly comprising:
   a resonant cavity, said resonant cavity having a first partially reflective mirror and a second partially relfective mirror arranged, in operation, such that said bleaching light beam resonates within said resonant cavity; and,
   a layer of organic photochromic material, said layer of organic photochromic material being arranged in said resonant cavity between said first partially transmitting mirror and said second partially mirror, each first light source being arranged such that, in operation, said bleaching light beam is incident upon said layer of photochromic material at a pre-determined position, said bleaching light beam tending to bleach said layer of photochromic material in accordance with its light intensity,
   each second light source being arranged such that, in operation, said colouring light beam is incident upon said layer of photochromic material at the pre-determined position, said colouring light beam tending to colour said layer of photochromic material in accordance with its light intensity,
   said bleaching light beam and said colouring light beam being arranged, in operation, to have at least one combined ambient relative light intensity at which a respective degree of bleaching of said layer of photochromic material by said bleaching light beam and a respective degree of colouring of said layer of photochromic material by said colouring light beam are substantially equal and stable to constitute a first ambient light transmittance value, each first light source and each second light source being relatively adjustable, in operation, such that said bleaching light beam intensity and said colouring light beam intensity are changed relative to one another to have a second combined relative light intensity,
   the second combined relative light intensity giving said layer of photochromic material a bleached light transmittance value, the bleached light transmittance value of said layer of photochromic material decaying to a second ambient light transmittance value when said intensity of said first light beam and said intensity of said second light beam are returned to said combined ambient relative light intensity,
   said second ambient light transmittance value of said layer of photochromic material being stable, when said first light beam and said second light beam are simulataneously removed.

2. An optical resonant assembly as claimed in claim 1 wherein first detecting means is provided preceding said resonant cavity for detecting light intensity and second detecting means is provided after said resonant caivty for detecting light intensity said first detecting means receiving a proportion of either the bleaching or the colouring light beam whereby a comparison between the light intensity measured by said first detecting means and light intensity measured by said second detecting means may be used to determine the light transmittance value of said layer of photochromic material.

3. An optical resonant assembly as claimed in claim 1 or 2 wherein there is provided a plurality of bleaching light beam sources, said plurality of said bleaching light beam sources and each colouring light beam source individually having insufficient intensity to effect a change in light transmittance value of said layer of photochromic material while in combination having sufficient light intensity to cause such a change in said layer of photochromic material.

4. An optical resonant assembly as claimed in claim 1 wherein the resonant cavity is a Fabry-Perot type arrangement.

5. An optical resonant assembly as claimed in claim 2 wherein said layer of photochromic material has two ambient light transmittance values dependent upon said light intensity ratio of said bleaching light beam and said colouring light beam.

6. An optical resonant assembly as claimed in claim 2 wherein said layer of photochromic material has more than two ambient light transmittance values dependent upon said light intensity ratio of said bleaching light beam and said colouring light beam.

7. An optical resonant assembly as claimed in claim 1 wherein two bleaching beams from two distinct first light sources are combined to give said bleaching light beam sufficient light intensity to alter the light transmittance value of said layer of photochromic material.

8. An optical resonant assembly as claimed in claim 1 wherein said bleaching light beam and said colouring light beam are deflectable to be incident upon mutually the same pre-determined position of said layer of photochromic material.

9. An optical assembly as claimed in claim 8 wherein said bleaching light beam and said colouring light beam are deflected in operation by moving the resonant cavity with respect to said bleaching light beam and said colouring beam.

10. An optical assembly as claimed in claims 2, 4, 5, 6, 7, 8 or 9 wherein said layer of photochromic material is selected from the group consisting of Ex-2,5,-dimethyl-3-furylethylidence(isopropylidene)succinic anhydride in toluene and Ex-2,5-dimethyl-3-furyl-ethylidene(admentylidene)succinic anhydride in toluene.

* * * * *